(12) United States Patent
Wolf et al.

(10) Patent No.: US 9,409,484 B2
(45) Date of Patent: Aug. 9, 2016

(54) POWER SUPPLY UNIT FOR A VEHICLE ELECTRICAL SYSTEM OF A MOTOR VEHICLE

(75) Inventors: Gert Wolf, Affalterbach (DE); Stefan Einbock, Vaihingen/Enz (DE); Rolf Jaros, Backnang (DE); Helmut Suelzle, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 684 days.

(21) Appl. No.: 13/811,546

(22) PCT Filed: Jul. 13, 2011

(86) PCT No.: PCT/EP2011/061989
§ 371 (c)(1),
(2), (4) Date: May 1, 2013

(87) PCT Pub. No.: WO2012/010484
PCT Pub. Date: Jan. 26, 2012

(65) Prior Publication Data
US 2013/0214594 A1  Aug. 22, 2013

(30) Foreign Application Priority Data
Jul. 22, 2010 (DE) .......................... 10 2010 031 640

(51) Int. Cl.
*B60L 11/06* (2006.01)
*H02P 9/30* (2006.01)
*H02P 9/48* (2006.01)

(52) U.S. Cl.
CPC ................. *B60L 11/06* (2013.01); *H02P 9/305* (2013.01); *H02P 9/48* (2013.01)

(58) Field of Classification Search
CPC ............. B60L 11/06; B60L 1/00–1/20; B60R 16/033; B60R 16/00; B60R 16/005–16/0215; B60R 16/0235; B60R 16/0239; B60R 16/03; B60R 16/04; H02J 7/00; H02P 9/305; H02P 9/48; B64D 41/00–41/007
USPC .................................................. 307/9.1–10.8
See application file for complete search history.

(56) References Cited

U.S. PATENT DOCUMENTS

| | | |
|---|---|---|
| 5,397,991 A | 3/1995 | Rogers |
| 2004/0222772 A1 | 11/2004 | Fujita et al. |
| 2008/0030184 A1 | 2/2008 | Okahara et al. |
| 2012/0188810 A1* | 7/2012 | Wohlfarth et al. ............ 363/126 |

FOREIGN PATENT DOCUMENTS

| | | |
|---|---|---|
| CN | 101123411 A | 2/2008 |
| DE | 10 2004 056663 | 6/2006 |

(Continued)

*Primary Examiner* — Kenneth B Wells
*Assistant Examiner* — James P Evans
(74) *Attorney, Agent, or Firm* — Norton Rose Fulbright US LLP

(57) ABSTRACT

An improved power supply unit for a vehicle electrical system of a motor vehicle, which has an a.c. generator, that provides a phase signal, having an excitation coil, a field regulator assigned to the excitation coil and a rectifier having rectifier elements for the rectification of the generator voltage supplied by the a.c. generator. The field regulator has a voltage detection range for the evaluation of the phase signal having a minimum value and a maximum value, the maximum value being adjusted to the nominal voltage of a power supply unit of the motor vehicle.

10 Claims, 1 Drawing Sheet

(56) References Cited

FOREIGN PATENT DOCUMENTS

| DE | 10 2006 024 850 | 11/2007 |
| DE | 10 2009 028 246 | 2/2011 |
| EP | 0 408 055 | 1/1991 |
| EP | 0989654 A1 | 3/2000 |

* cited by examiner

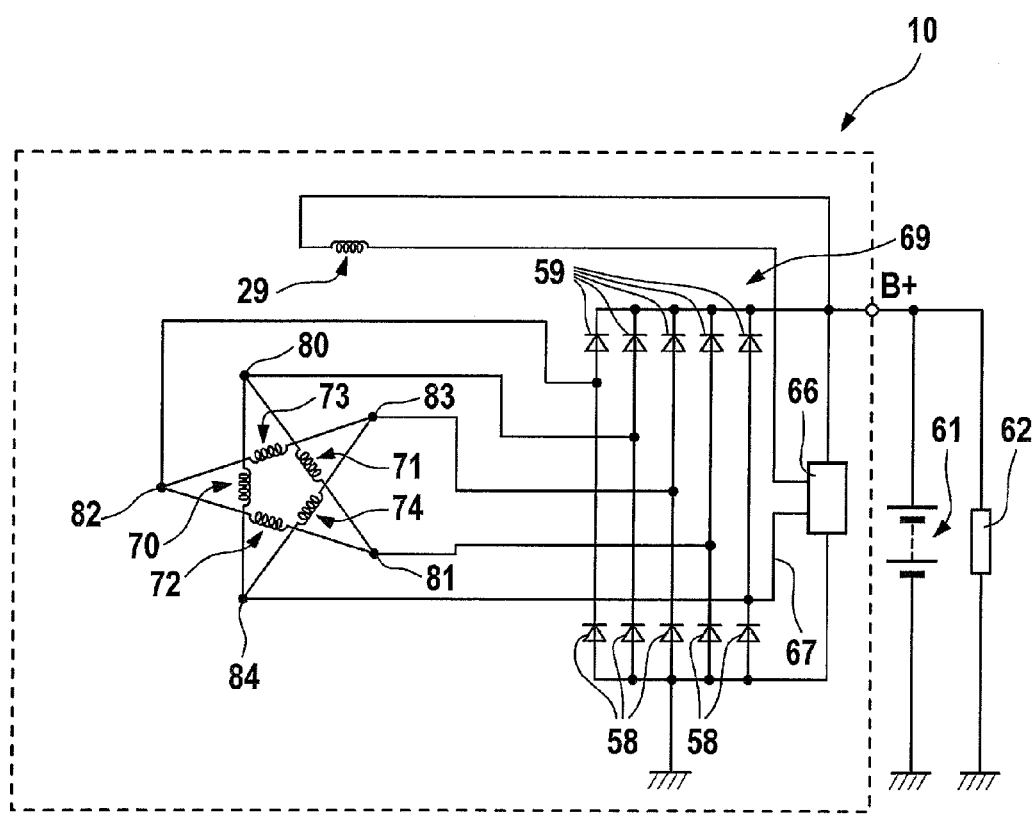

POWER SUPPLY UNIT FOR A VEHICLE ELECTRICAL SYSTEM OF A MOTOR VEHICLE

FIELD OF THE INVENTION

The present invention relates to a power supply unit for a vehicle electrical system of a motor vehicle.

BACKGROUND INFORMATION

Motor vehicle generators may include a diode bridge circuit, by which the alternating voltage generated by the generator is rectified.

Diode rectifiers may be relatively robust and reliable, and are consequently particularly suitable for operation in a motor vehicle. They do, however, have certain disadvantages too. In particular, diodes demonstrate a voltage drop in the forward direction that is not negligible. Zener diodes, particularly ZR diodes, are used for the rectifiers, which normally have a forward voltage of ca. 0.7 V. Along with the intermittently large currents of more than 200 A, this leads to a power loss at the diode of up to 50 W (in the case of three-phase generators). As a result, the diodes have to be designed for this sort of power, and especially also have to be sufficiently cooled.

Diodes having a lower forward voltage are known, such as germanium diodes or Schottky diodes, but these cannot be used in the vehicle field without any problem, since especially their characteristic temperature dependence makes using them impossible in known power supply units for motor vehicles, for the following reasons:

At the start of the vehicle, the field controller or charge controller, fed by the starter battery, supplies current to the exciter winding of the generator using a so-called preexcitation current. As soon as the rotor of the generator is turning, the field regulator is able to detect a voltage signal at one phase (in the following phase signal) and, from its frequency, derive the generator rotational speed. When a specified cut-in speed is reached, the full excitation current is then started.

In the usual power supply units for the vehicle electrical system of a motor vehicle, however, the a.c. component of the phase signal has to have a certain minimum voltage. In addition, the d.c. component of the phase signal may not exceed a certain threshold. The minimum required phase alternating voltage may amount to 3 V, for example, measured from peak to peak, and the maximum admissible d.c. current component 8 V, for example.

During the preexcitation clocking, when the generator is not yet supplying any current into the vehicle electrical system, the d.c. current value and the a.c. voltage value of the phase voltage are influenced by the blocking-state currents of the rectifier diodes. Now, if the abovementioned diodes are used, which demonstrate a characteristic temperature dependence, in the heated state, for example, at a time after shutting down the internal combustion engine, there is a different voltage drop at each diode. Therefore, in the extreme case, the d.c. portion of the phase voltage may assume values outside an admissible range, so that the field regulator, for example, at a starting process in the heated state, does not detect, or detects too late the starting rotational speed and does not switch on, or switches on the generator too late.

It is therefore believed to be desirable to provide a power supply unit for a vehicle electrical system of a motor vehicle, which is suitable for the use of temperature-dependent rectifier elements.

SUMMARY OF THE INVENTION

According to the exemplary embodiments and/or exemplary methods of the present invention, a power supply unit is provided having the features of the independent claims. Advantageous refinements are the subject matter of the following description.

The exemplary embodiments and/or exemplary methods of the present invention are based on the measure of increasing the phase signal detection range in such a way that essentially all the possible occurring voltages are able to be detected. With that, the particular advantage may be achieved of also being able to use temperature-dependent diodes, and thus to be able to implement their advantages. There are diodes having an advantageously low forward voltage, for example, of less than 0.5 V, which may be less than 0.3 V or 0.4 V, so that during operation, a lower power loss drops off in comparison to usual ZR diodes. In response to the use of such diodes, the efficiency of the generator is increased and the quantity of heat to be dissipated is reduced. The cooling measures required for the diodes may thus also be reduced. Suitable rectifier elements are particularly Schottky diodes, TMBS diodes, TJBS diodes and/or lambda diodes in appropriate designs. Furthermore, in the cold state, i.e., for example, below 50° C., such diodes demonstrate a very slight leakage current which, in the case of a motor vehicle particularly counteracts the discharge of the starter battery.

It was recognized that the use of improved diodes, as are discussed in DE 10 2006 024 850 A1, for example, is particularly easily possible in power supply units for motor vehicles, if the field regulator or charge regulator is developed accordingly. Customary field regulators are only in a position to scan or detect a phase signal within a voltage range by half the vehicle system voltage, e.g. of ca. 3 V to ca. 9 V in a 12 V vehicle electrical system. Based on the abovementioned special temperature dependence of rectifier elements, however, at the rectifier branches, voltages may drop from the range of nearly 0 V to nearly the on-board voltage. The use of diodes having a low forward voltage is therefore possible if the field regulator is able to detect just this voltage range essentially completely, or has a voltage detection range for the evaluation of phase signals having a minimum value and a maximum value, at least the maximum value being adjusted to the nominal voltage of the power supply unit of the motor vehicle. The minimum value may also be adjusted or amount to 0 V. The adjustment may take place in a specifiable percentage value (0-100%) of the nominal voltage, one skilled in the art selecting a suitable percentage value in practice.

The basic technology of charge regulators used in the related art, particularly the incapability of detecting certain voltages, has long been essentially unchanged, and is not questioned in professional circles. Therefore, the use of special rectifying elements in the related art is always made possible by an appropriate design of the rectifier itself, whether by special cooling measures or special interconnections, such as in German document DE 10 2009 028 246, that was not prepublished. It has been recognized, however, that a possibility for using special rectifier elements in the configuration according to the exemplary embodiments and/or exemplary methods of the present invention lies in the charge regulator.

The exemplary embodiments and/or exemplary methods of the present invention may particularly advantageously be used in motor vehicles, aircraft or waterborne vehicles. Claw generators are expediently used as generators, even for recuperative systems, such as in belt-driven starter generators.

Further advantages and embodiments of the exemplary embodiments and/or exemplary methods of the present invention are derived from the description and the accompanying drawing.

It is understood that the features mentioned above and the features yet to be described below may be used not only in the combination given in each case but also in other combinations or individually, without departing from the scope of the exemplary embodiments and/or exemplary methods of the present invention.

The exemplary embodiments and/or exemplary methods of the present invention are represented schematically in the drawing in light of an exemplary embodiment, and is described in detail below with reference to the drawings.

BRIEF DESCRIPTION OF THE DRAWING

FIG. 1 shows a circuit diagram of a specific embodiment of a power supply unit according to the present invention.

DETAILED DESCRIPTION

In a specific embodiment, FIG. 1 shows a power supply unit, according to the present invention, in a circuit diagram. The power supply unit includes an alternating current generator 10 having five phase-forming phase windings 70, 71, 72, 73, 74. Obviously, other numbers of phases and interconnections are possible, particularly three-phase (or generally multiphase) systems in star connection or delta connection. The totality of all phase windings 70, 71, 72, 73, 74 forms the stator winding. The five phase-forming phase windings 70, 71, 72, 73, 74 are interconnected in this case to form a basic circuit as a five-pointed star (drude's foot), the windings interconnected in the points of the star include an angle of about 36 degrees. A rectifier bridge circuit 69 is connected to the interconnection points of points 80, 81, 82, 83, 84. The phase windings are interconnected as follows:

Partial phase winding 70 is connected to partial phase winding 71 at interconnecting point 80. Phase winding 71 is connected at its opposite end to phase winding 72 at interconnecting point 81. Phase winding 72 is connected at its opposite end to phase winding 73 at interconnecting point 82. Phase winding 73 is connected at its opposite end to phase winding 74 at interconnecting point 83. Phase winding 74 is connected at its opposite end to phase winding 70 at interconnecting point 84.

Interconnecting points 80, 81, 82, 83, 84 of phase windings 70, 71, 72, 73, 74 are connected to separate bridge rectifier 69, which is made up of five minus diodes 58 and five plus diodes 59. On the direct voltage side, a voltage regulator (so-called field regulator or charge regulator) 66 is connected in parallel which, by influencing the current through excitation winding 29, regulates the voltage of the generator. Voltage regulator 66 is connected to the rectifier to detect the output voltage and to set the excitation current. Moreover, voltage regulator 66 is connected via a connection 67 to at least one phase (84 in this case) of a.c. generator 10, to detect a phase signal. Based on the detected phase signal, voltage regulator 66 determines the rotational speed of a.c. current generator 10.

The vehicle electrical system is represented schematically by vehicle battery 61 and by vehicle loads 62.

Diodes 58 and 59 are diodes as discussed, for instance, in DE 10 2006 024 850 A1. The use of these diodes leads to a series of advantages, such as a reduced power loss, reduced closed-circuit current, etc. As was explained, these diodes also show a characteristic temperature dependence, which usual voltage regulators are not able to handle. When the generator is shut off, either because it is standing still or because the excitation current is shut off by the excitation coil, greatly different voltages drop at diodes 58 and 59, so that usual voltage regulators are not able to detect the rotational speed, i.e. in this case the standstill, of the generator. Extreme voltages too, which may occur, for example, during the start of the motor vehicle, shortly after shutoff, are not able to be detected. For, at driveaway, the battery voltage dropping at the diodes is overlapped on the phase signal, and the battery voltage, as explained at the outset, may be clearly displaced from the middle.

According to the specific embodiment of the present invention shown here, voltage regulator 66 is developed to have a voltage detection range for the phase signal which is adjusted to the nominal voltage of vehicle battery 61. For this, voltage regulator 66 particularly has an analog/digital converter to evaluate the phase signal, in order to cover at least the voltage range of 0 V to 12 V (nominal voltage). As a result, the phase signal is also able to be detected if it is overlapped by a greatly displaced d.c. voltage portion of, for instance, nearly the on-board voltage.

What is claimed is:

1. A power supply unit for an electrical system of a motor vehicle, which has an a.c. generator that provides a phase signal, comprising:
   an excitation coil;
   a field regulator assigned to the excitation coil; and
   a rectifier having rectifying elements to rectify a generator voltage supplied by the a.c. generator;
   wherein:
      the field regulator has a voltage detection range for evaluating the phase signal having a minimum value and a maximum value, and
      the maximum value is adjusted to a nominal voltage of a power supply unit of the motor vehicle.

2. The power supply unit of claim 1, wherein the maximum value is adjusted to the nominal voltage of one of the a.c. generator and a starter battery, which is for starting the motor vehicle.

3. The power supply unit of claim 1, wherein the maximum value corresponds at least to a value which is in a range of 85% to 100% of the nominal voltage.

4. The power supply unit of claim 1, wherein the minimum value corresponds at most to a value which is in a range of 0% to 15% of the nominal voltage.

5. The power supply unit of claim 1, wherein the field regulator includes an analog/digital converter, which has a voltage detection range for evaluating the phase signal using the minimum value and the maximum value.

6. The power supply unit of claim 1, wherein the rectifier elements are configured as trench elements.

7. The power supply unit of claim 1, wherein the rectifier elements include at least one of a Schottky diode, a TMBS diode, a TJBS diode, and a lambda diode.

8. A power supply unit for an electrical system of a motor vehicle, which has an a.c. generator that provides a phase signal, comprising:
   an excitation coil;
   a field regulator assigned to the excitation coil; and
   a rectifier having rectifying elements to rectify a generator voltage supplied by the a.c. generator;
   wherein:
      the field regulator has a voltage detection range for evaluating the phase signal having a minimum value and a maximum value, and
      the maximum value is adjusted to a nominal voltage of one of the a.c. generator and a starter battery connected to the a.c. generator.

9. The power supply unit of claim 8, wherein the maximum value is adjusted to a nominal voltage of the starter battery, and wherein the field regulator evaluates the phase signal and controls the excitation coil accordingly during a time when a voltage from the starter battery overlaps with the phase signal.

10. The power supply unit of claim 9, wherein the voltage overlapping the phase signal is a d.c. voltage of the starter battery and is passed into the a.c. generator through the rectifier elements.

* * * * *